United States Patent
Naqvi

(10) Patent No.: US 10,824,440 B2
(45) Date of Patent: Nov. 3, 2020

(54) DERIVING PERSONALIZED EXPERIENCES OF SMART ENVIRONMENTS

(71) Applicant: Sensoriant, Inc., Cedar Knolls, NJ (US)

(72) Inventor: Shamim A. Naqvi, Morristown, NJ (US)

(73) Assignee: SENSORIANT, INC., Cedar Knolls, NJ (US)

(*) Notice: Subject to any disclaimer, the term of this patent is extended or adjusted under 35 U.S.C. 154(b) by 321 days.

(21) Appl. No.: 15/874,395

(22) Filed: Jan. 18, 2018

(65) Prior Publication Data

US 2018/0181414 A1 Jun. 28, 2018

Related U.S. Application Data

(63) Continuation-in-part of application No. 14/466,676, filed on Aug. 22, 2014, now Pat. No. 10,698,930, and
(Continued)

(51) Int. Cl.
*H04L 9/32* (2006.01)
*G06F 9/445* (2018.01)
(Continued)

(52) U.S. Cl.
CPC ............. *G06F 9/4451* (2013.01); *G06F 8/30* (2013.01); *G06F 8/41* (2013.01); *G06F 8/60* (2013.01);
(Continued)

(58) Field of Classification Search
CPC ............. G06F 9/4451; G06F 9/45558; G06F 2009/45562; G06F 8/60; G06F 8/30; H04L 67/306; G06Q 30/06–0603
See application file for complete search history.

(56) References Cited

U.S. PATENT DOCUMENTS

| 7,013,149 B2 | 3/2006 | Vetro |
| 7,315,826 B1 | 1/2008 | Guheen et al. |

(Continued)

FOREIGN PATENT DOCUMENTS

| WO | 2011/161303 | 12/2011 |
| WO | 2011/161303 A1 | 12/2011 |
| WO | 2013187935 A1 | 12/2013 |

OTHER PUBLICATIONS

Frost, James "iBeacon in iOS 8 getting location based notifications, plus: FCC filing suggests Apple to launch own iBeacon hardware" published Sep. 2, 2014, retrieved from http://www.macworld.co.uk/news/iosapps/apples-plans-for-ibeacon-hardware-new-ios-8-location-notifications-3542708/ (4 pages total).
(Continued)

*Primary Examiner* — Trong H Nguyen
(74) *Attorney, Agent, or Firm* — Stuart H. Mayer; Mayer & Williams PC

(57) ABSTRACT

A method for obtaining a representation of an environment includes requesting device context information from a user device. The request is sent to the user device from a virtual machine environment established by a database processor. The virtual machine environment is established by the database processor in response to a request received from the user device over a network for a representation of an environment. User preference information is requested and the device context information and the user preference information are received in the virtual machine environment. Based on the device context information, an environmental data set (EDS) is identified that includes information reflective of the environment. The EDS is received in the virtual machine environment and the EDS is modified based at least in part on the user preference information. Execut-
(Continued)

able computer code is constructed for generating a representation from the modified EDS and sent to the user device.

12 Claims, 6 Drawing Sheets

Related U.S. Application Data a continuation-in-part of application No. 14/701,858, filed on May 1, 2015, now Pat. No. 10,614,473.

(60) Provisional application No. 62/447,802, filed on Jan. 18, 2017.

(51) Int. Cl.
   *H04L 29/06*   (2006.01)
   *G06F 9/455*   (2018.01)
   *G06F 8/30*    (2018.01)
   *G06F 8/60*    (2018.01)
   *G06F 8/41*    (2018.01)
   *H04L 29/08*   (2006.01)

(52) U.S. Cl.
   CPC ...... *G06F 9/45558* (2013.01); *H04L 63/0428* (2013.01); *H04L 67/02* (2013.01); *H04L 67/306* (2013.01); *G06F 2009/45562* (2013.01)

(56) References Cited

U.S. PATENT DOCUMENTS

| | | | |
|---|---|---|---|
| 7,685,023 B1* | 3/2010 | Abraham | G06Q 30/0603 705/27.2 |
| 7,702,760 B2 | 4/2010 | Latvakoski | |
| 7,752,539 B2 | 7/2010 | Kopra | |
| 7,810,153 B2 | 10/2010 | Perlin et al. | |
| 7,994,981 B1 | 8/2011 | Farrokhi | |
| 8,572,481 B2 | 10/2013 | Migos | |
| 8,683,348 B1 | 3/2014 | Blank et al. | |
| 8,688,726 B2 | 4/2014 | Mahajan | |
| 8,826,013 B1* | 9/2014 | Kodukula | G06F 21/53 380/279 |
| 8,831,994 B1 | 9/2014 | Hoffman | |
| 9,063,811 B2 | 6/2015 | Stekkelpak | |
| 10,335,962 B1 | 7/2019 | Rosenberg | |
| 2002/0160766 A1 | 10/2002 | Portman | |
| 2004/0073490 A1* | 4/2004 | Shah | G06Q 10/08 705/26.1 |
| 2004/0153548 A1 | 8/2004 | Latvakoski | |
| 2004/0203851 A1 | 10/2004 | Vetro | |
| 2005/0255839 A1 | 11/2005 | Perttila | |
| 2006/0020483 A1 | 1/2006 | Hsu | |
| 2006/0036751 A1 | 2/2006 | Garbow et al. | |
| 2006/0178918 A1 | 8/2006 | Mikurak | |
| 2007/0010195 A1 | 1/2007 | Brown | |
| 2007/0050820 A1 | 3/2007 | Saarikivi | |
| 2007/0061198 A1 | 3/2007 | Ramer | |
| 2007/0061244 A1 | 3/2007 | Ramer | |
| 2007/0061245 A1 | 3/2007 | Ramer | |
| 2007/0073717 A1 | 3/2007 | Ramer | |
| 2007/0073718 A1 | 3/2007 | Ramer | |
| 2007/0073719 A1 | 3/2007 | Ramer | |
| 2007/0171921 A1 | 7/2007 | Wookey et al. | |
| 2007/0198485 A1 | 8/2007 | Ramer | |
| 2007/0198656 A1* | 8/2007 | Mazzaferri | G06F 3/1415 709/218 |
| 2008/0256054 A1 | 10/2008 | Saaty | |
| 2009/0177603 A1 | 7/2009 | Honiscid | |
| 2009/0300635 A1* | 12/2009 | Ferris | G06F 9/5072 718/104 |
| 2010/0121705 A1 | 5/2010 | Ramer | |
| 2010/0199098 A1 | 8/2010 | King | |
| 2010/0232405 A1 | 9/2010 | Kikuchi | |
| 2011/0119351 A1 | 5/2011 | Tamura | |
| 2011/0145076 A1 | 6/2011 | Ramer | |
| 2011/0302153 A1 | 12/2011 | Meretakis | |
| 2012/0084349 A1 | 4/2012 | Lee | |
| 2012/0215755 A1 | 8/2012 | Kumar | |
| 2012/0265811 A1 | 10/2012 | Bist | |
| 2012/0271548 A1 | 10/2012 | Koehler et al. | |
| 2012/0284247 A1 | 11/2012 | Jiang | |
| 2012/0284256 A1 | 11/2012 | Mahajan | |
| 2012/0289788 A1 | 11/2012 | Jain | |
| 2012/0303412 A1 | 11/2012 | Etzioni | |
| 2013/0024492 A1 | 1/2013 | Graff et al. | |
| 2013/0152000 A1 | 6/2013 | Liu | |
| 2013/0159996 A1 | 6/2013 | Lin | |
| 2013/0205243 A1 | 8/2013 | Rivera | |
| 2013/0275230 A1 | 10/2013 | Sawyer et al. | |
| 2013/0317950 A1* | 11/2013 | Abraham | G06Q 30/06 705/27.1 |
| 2014/0025540 A1 | 1/2014 | Henrickson | |
| 2014/0032406 A1 | 1/2014 | Roach | |
| 2014/0040226 A1 | 2/2014 | Sadhukha | |
| 2014/0089243 A1 | 3/2014 | Oppenheimer | |
| 2014/0129942 A1 | 5/2014 | Rathod | |
| 2014/0142949 A1 | 5/2014 | Newman | |
| 2014/0200991 A1 | 7/2014 | Wu | |
| 2014/0250433 A1 | 9/2014 | Stekkelpak | |
| 2014/0379273 A1 | 12/2014 | Petisce | |
| 2014/0379747 A1 | 12/2014 | Majumder | |
| 2015/0039420 A1 | 2/2015 | Rao | |
| 2015/0058355 A1 | 2/2015 | Naqvi | |
| 2015/0127940 A1 | 5/2015 | Polehn et al. | |
| 2015/0178511 A1 | 6/2015 | Klappert et al. | |
| 2015/0310020 A1 | 10/2015 | Bray | |
| 2015/0340763 A1 | 11/2015 | Stepanenko | |
| 2016/0270717 A1 | 9/2016 | Luna | |
| 2016/0357794 A1 | 12/2016 | Liang | |
| 2017/0070778 A1 | 3/2017 | Zerlan | |
| 2019/0239040 A1 | 8/2019 | Va | |

OTHER PUBLICATIONS

Barrett, "Google's Going to Make Downloading Apps an Afterthought", Nov. 19, 2015, downloaded at http://www.wired.com/2015/11/google-streaming-apps-search/, 4 pages.

Lardinois, "Google takes a new approach to native apps with instant apps for android" May 19, 2016, 8 pages.

Rich McCormick, "Android Instant Apps are now available for limited testing", dated Jan 24, 2017, 2 pages.

Eugeny Morozov, "To Save Everything, Click Here: The Folly of Technological Solutionism" Public Affairs, 2013, 6 pages.

Hastie et al., "The Elements of Statistical Learning Data Mining, Inference, and Prediction", 32 pages. Second Edition, Springer, 2009.

* cited by examiner

| | Cal | Loc | Dev | Browser | Link | Code | Display | Exec | Owner | Acc | Rel | EDS |
|---|---|---|---|---|---|---|---|---|---|---|---|---|
| Snippet 237 | | | | | | | | | | | | |
| Snippet 343 | | | | | | | | | | | | |
| Snippet 452 | | | | | | | | | | | | |
| ... | | | | | | | | | | | | |

FIG. 1

| ATTRIBUTE | EXPLANATION |
|---|---|
| CAL | CALENDAR CONTEXT: DATE AND TIME OF OPERABILITY OF SNIPPET |
| LOC | GEOGRAPHICAL CONTEXT: LOCATION WHERE THE SNIPPET IS OPERABLE |
| DEV | DEVICE CONTEXT: NAME OF APP RUNNING ON DEVICE WHEN OPERABILITY OF SNIPPET IS REQUESTED |
| BROWSER | RECOMMENDED BROWSER TO DISPLAY SNIPPET |
| LINK | LINK TO ACCESS MORE INFORMATION ABOUT SNIPPET |
| CODE | EXECUTABLE CODE ASSOCIATED WITH THE SNIPPET |
| DISPLAY | RECOMMENDED DISPLAYS TO DISPLAY THE SNIPPET |
| EXEC | RUN SNIPPET CODE |
| OWNER | OWNER OF SNIPPET |
| ACC | ACCOUNTING INFORMATION |
| REL | TAGS THAT SPECIFY CATEGORIES APPLICABLE TO THE SNIPPET |
| EDS | LOCATION OF ASSOCIATED DATASETS IN EDS |

*FIG. 2*

100: Initialization.
        (a) Service provider(s) send snippets and their attributes.
        (b) Database complex creates snippet index (database).
        (c) Database complex associates snippets with EDS (Datasets).
        (d) User downloads one or more apps to user communications device and initializes them for later use.

200: Request.
        (a) User device launches an app and uses app to request representation of an environment.
        (b) App transmits geographical, calendar and device context obtained from the user device or associated sensor devices.

300: Database complex.
        (a) Discovers relevant snippets in snippet database.
        (b) Discovers EDS associated with the discovered snippets.
        (c) Receives user preferences.
        (d) Changes the one or more EDS based on user preferences.
        (e) Constructs executable code (containing executable code from the snippet)
                corresponding to the one or more representations of the EDS.
        (f) Sends the constructed executable codes to the user device.

400: App/User Device.
        (a) Receives executable codes corresponding to the one or more representations.
        (b) Changes the executable codes with respect to device characteristics. (Optional)
        (c) The representation may contain active components.
        (d) Executes the received and changed executable codes.

500: User.
        (a) User may not interact with the rendering of the executable codes, e.g., using the active components.

FIG. 4

100: Initialization.
    (a) Developers send snippets and their attributes to a database complex.
    (b) Database Complex creates snippet index (database).
    (c) Database Complex associates snippets with EDS (Datasets).

200: Request.
    (a) User device uses Browser to visit a website that is known to be associated with the device's current environment.
    (b) Website re-directs user device to database processor.

250: Database Processor.
    (a) Database processor creates computing environment with virtual machine (VM).

300: VM.
    (a) VM requests user device for geographical, device and calendar contexts.
    (b) VM requests user device for user preferences.
    (c) Device transmits geographical, calendar and device context.
    (d) Discovers relevant snippets in snippet database.
    (e) Discovers EDS associated with the discovered snippets.
    (f) Receives user preferences.
    (g) Changes the one or more EDS based on user preferences.
    (h) Constructs executable codes (containing the executable code of the snippet)
        corresponding to the one or more representations of the EDS.
    (i) Sends the constructed executable codes to the website.
    (j) Re-directs user device to website.

400: Website.
    (a) Converts received representation into a webpage.

450: User Device/Browser.
    (a) Receives webpage containing executable codes sent from website.
    (b) The representation may contain active components.
    (c) Renders received web page.

500: User.
    (a) User may now interact with the rendering of the representation using the active components.
    (b) User ends session. Website informs database processor that clears VM.

FIG. 5

DERIVING PERSONALIZED EXPERIENCES OF SMART ENVIRONMENTS

CROSS-REFERENCE

This application claims priority to U.S. Provisional Application Ser. No. 62/447,802, filed Jan. 18, 2017. This application is also a continuation-in-part of U.S. Ser. No. 14/466,676, filed Aug. 22, 2014, entitled "Method and System for Addressing the problem of Discovering Relevant Services and Applications that are available over the Internet and other Communications Networks", and a continuation-in-part of U.S. application Ser. No. 14/701,858, filed May 1, 2015 entitled "A System and Method for Mediating Representations with Respect to User Preferences", the contents of which are incorporated herein by reference.

BACKGROUND

Personalization is a major component in Internet applications and services. Web pages are often customized to user preferences. Content on web pages may be chosen to conform to preferences of users. Advertisements are targeted to particular users. Apps provide customized services based on user profiles and user provided data. Personalization has been a central component of Internet services for more than a decade.

SUMMARY

In accordance with one aspect of the subject matter described herein, a system and method is presented for obtaining a representation of an environment. In accordance with the method, device context information is requested from a user communications device associated with a user. The request is sent to the user communication device from a virtual machine environment established by a database processor. The virtual machine environment is established by the database processor in response to a request received from the user communications device over a communications network for a representation of an environment associated with a third party. User preference information is requested and the device context information and the user preference information are received in the virtual machine environment. Based at least in part on the device context information, at least one environmental data set (EDS) is identified that is associated with the environment and includes information reflective of the environment. The EDS is received in the virtual machine environment and, while in the virtual machine environment, the EDS is modified based at least in part on the user preference information. Executable computer code is constructed for generating a representation from the modified EDS. The executable code is caused to be sent to the user communications device.

BRIEF DESCRIPTIONS OF THE DRAWINGS

FIG. 1 shows an exemplary snippet database.

FIG. 2 defines exemplary attributes that may be included in a snippet database.

FIG. 4 illustrates one example of a method for generating a single representation of an environment.

FIG. 5 shows another example of a method for generating a representation of an environment.

DETAILED DESCRIPTION

Introduction

Figure 3:
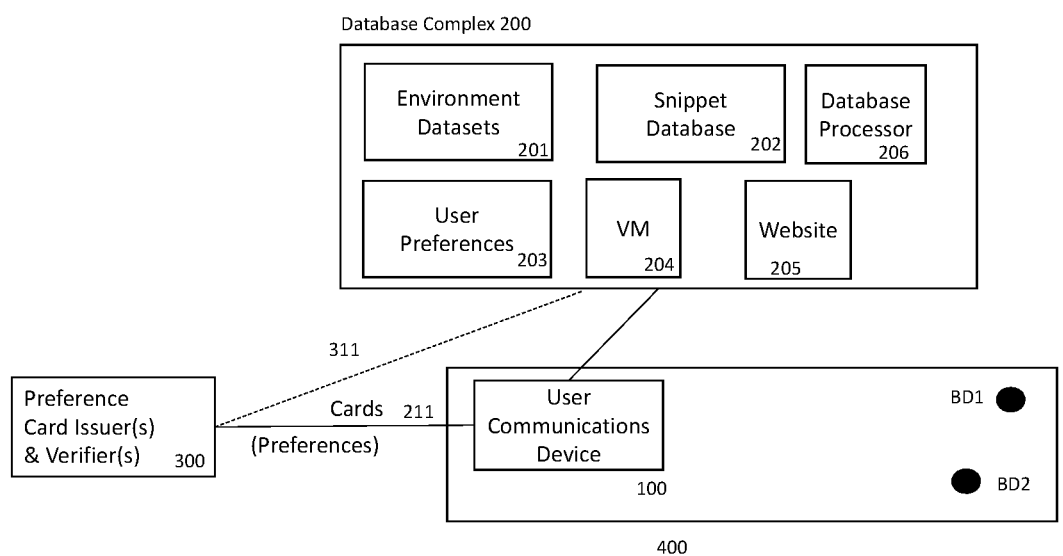
FIG. 3 shows one exemplary system architecture for implementing aspects of the methods and techniques described herein.

Personalization of services is a basic aspect of Internet and web services. Content and web pages are constructed dynamically to suit the preferences and tastes of consumers. Advertisements are tailored to specific users. The systems and techniques described herein may be applied to personalize, e.g., geographical, environments such as smart homes, retail stores, shopping malls, smart cars, etc. In particular, two kinds of personalization are envisioned that may be described as follows.

In a first kind of personalization, environments are personalized by creating datasets called representations (also referred herein as experiences) of an environment, e.g., a geographical environment, that are tailored to specific preferences of a single user. These representations may then be delivered, e.g., to the user's communications device.

In a second kind of personalization, environments are personalized by creating representations of an environment, e.g., a geographical environment, that are tailored to groups of users. These representations may then be delivered to the respective communications devices of the group members or rendered on one or more common devices in the environment, e.g., within the confines of a retail store or smart car using Internet connected devices available to all customers of the store or all the occupants of the car.

Illustrative Embodiments

We present two illustrative embodiments to demonstrate aspects of the present invention. However, these and other such exemplary embodiments described later do not limit the scope of the present invention in any manner, which is to be determined by the claims attached herein.

In a first embodiment, we consider a smart car traversing a route along which one or more retail stores are located. The occupants of the car are interested in knowing if the retail stores carry products that are of interest to them. That is, the occupants may wish to search the store inventories with respect to their preferences. As the smart car traverses, say, a street, the inventories of the stores on the street are searched and "relevant" items of interest may be displayed on the user communications devices of the occupants. A data object would thus be delivered to each occupant that when rendered on his communications device may display items of interest to him in the nearby store. As the car continues to move, the display changes to the next nearby store along the route of the car. Note that the route of the car may be pre-determined by navigation software. In a certain sense, this example illustrates a different notion of "points of interest" (POI) that are commonly provided by many navigation software systems.

In a second embodiment, consider the case that the smart car has a single display device for all the occupants of the car and we are now interested in displaying the items of interest that may appeal to all the occupants. That is, we are interested in "aggregating" the preferences of all the occupants with respect to the inventories of the nearby stores and display the result on the display device of the car.

Note that in this use case, we are interested in catering to the preferences of all occupants of the car, not any single occupant. Other use cases readily follow, as for example, a retail store that wishes to play background music in the store for all its customers. Alternatively, the store may wish to set the overall temperature of the store so that it is comfortable for all the customers currently visiting the store at a given time.

The following elements are significant in the above two exemplary illustrative embodiments. They will be explained in greater detail below.

1. The notion of datasets representing the inventories of the environments (e.g., business premises such as retail stores, smart homes, etc.)
2. The notion of "nearby" implying a relationship between computer programs (e.g., the computer program that determines items of interest, or the program that searches the inventory dataset) and geography (e.g., the location of the store and/or the car).
3. The notion of user "preferences" that guides the searching of the various datasets.
4. The notion of "aggregating" preferences so as to satisfy multiple users.
5. Management of preferences whilst maintaining privacy of the users.
6. The ability of users to receive information about items of interest without using a priori downloaded apps and/or opt-in mechanisms.

Technological Innovations

The systems and techniques described herein offer a number of improvements to the technology of database systems, app stores and to the general functioning and utility of apps.

With respect to improvements to general functioning and utility of apps, it is widely known that apps need to be downloaded prior to their use by a consumer. Thus, consumers have to discover an app, download it and prepare to use it later, e.g., by establishing an account with the app provider. In many situations, a consumer may wish to run more than one app. For example, consider the first exemplary embodiment above. An occupant of the car wishing to search nearby stores (as the car traverses its route) needs to acquire and then run the app of each nearby store. This would require a succession of apps to have been downloaded a priori, set up for later use and then launched manually by each occupant of the car. There may thus be a need for a sequence of manual operations expected of each occupant of the car.

In one aspect, the systems and techniques described herein introduce the notion of executable codes running in a remote computing environment that serve the needs of consumers in an environment such as a smart car, a smart home or other business premises such as a shopping mall, etc.

Since the customers of a store or the occupants of a car may wish to search the inventory of the stores with respect to user preferences, these preferences need to be communicated to the respective apps. This introduces a possible additional manual step. It may, however, be obviated if the user preferences were to be available to the, e.g., operating system, of the user communication device that may then provide the user preferences to the apps on the user device that need the preferences (or to the executable codes in the remote computing environment). The systems and techniques described herein avoid the need for this manual step and, moreover, may accomplish the communication of user preferences in a privacy preserving manner.

A database system along with a database processor, i.e., a special computer program, may be constructed so as to associate special-purpose executable codes with device context, geographic context and calendar (e.g., date and time) context in a manner that the executable codes are discoverable and operable when a request from a user communications device is received, provided the user communications device satisfies the device, geographical and calendar contexts.

Additionally, a proposed route may be provided as a part of the incoming request to the database processor that may then identify "relevant" executable codes based on the geographical and calendar contexts that lie along the proposed route. Thus, the database processor may construct a sequence of operations in which the executable codes may be executed in synchronization with the proposed route being traversed by the user communication device.

It is to be noted that the database processor is not to be confused with a conventional geographical database system, i.e., a database system that stores information about geographical locations or objects described by their locations. In our case, the database processor has access to a database system that stores executable codes. The latter are associated with geographic locations in such a manner that they become discoverable and operable when incoming requests satisfy the contextual constraints imposed on the executable codes. The database processor further provides an execution environment wherein discovered executable codes may be executed (with respect to user preferences) and the results of their executions provided to one or more user devices.

Thus, the proposed database processor has the following characteristics.

1. It has access to a store of executable codes.
2. It associates stored executable codes with device, geographical and calendar contexts.
3. It makes the executable codes discoverable and operable when the contexts are satisfied by a user communications device making an incoming request.
4. In response to requests from a user communications device, it constructs an operating environment in which discovered executable codes may execute, i.e., become operable, in a user privacy preserving manner.
5. The result of the execution of the executable code in response to an incoming request is itself an executable code, e.g., an HTML (Hyper Text Markup Language) script that may be provided, e.g., to a website, that may then deliver the HTML script to one or more user communications devices. (Unlike conventional database systems, the response does not comprise one or more stored objects. It comprises executable codes.)

In a sense, the database technology proposed herein is an improvement of both database systems and app stores since 1) it obviates the need for downloading apps before their use in user devices, 2) it allows a single input and output to address and/or serve the needs of multiple apps, and 3) provides a user privacy preserving model of managing the user preferences whilst providing personalized experiences (representations).

Moreover, by avoiding the need to download and operate apps on the user communications device, the resources (e.g., memory, processing power, battery life) of the user communications device, which are often limited, are preserved so that they are available for other tasks.

As mentioned earlier, the details of these various technological notions are presented later.

Snippet Database

A conventional database system stores data objects and provides them upon requests made by client programs. Many query languages have been described in prior art that support data retrieval requests from a database system. An app store may be viewed as a database system that stores computer programs (applications or "apps"). An app store may be searched for apps by name or other attributes describing the apps. A searchable index is a data structure that lists data objects indexed by one or more keywords. Given one or more keywords, the searchable index may be searched to find the corresponding data objects. For example, a web search engine supports an index that when provided with keywords, returns corresponding web page addresses.

In co-pending U.S. patent application Ser. No. 14/466,676, the contents of which are incorporated by reference in its entirety, methods are described by which web pages or other web resources are analyzed and fragments of the pages, referred to as snippets, are extracted. Where possible, the extracted are associated with a geographical and calendar context that also may be extracted from the web pages.

In some cases, the snippets are obtained from web pages using web crawling mechanisms. In other cases, web pages are "pushed". In the latter case, the pushed web pages may contain, e.g., special HTML tags, demarcating the snippets and the geographical and calendar contexts.

Snippets may in general contain many kinds of information. For instance, some snippets contain executable code (or contain a link to executable code). In such cases, the snippets may be viewed as a kind of "app" that is to be discovered and executed based on its geographical and calendar contexts.

Advantageously, a developer may provide one or more web pages, e.g., a web catalog, describing various executable codes that may be made available to consumers. Using a web crawling mechanism, the executable codes may be extracted as snippets and stored in a searchable index. U.S. patent application Ser. No. 14/466,676, refers to such snippets as being discoverable under a geographical and/or calendar context. That is, a user communications device searching the searchable index of snippets may discover snippets whose geographical and calendar contexts may match that of the device itself. Thus, for example, a user communications device located at Yankee Stadium on game day may discover snippets whose geographical and calendar contexts match that of the device.

When stored snippets contain executable codes, we state that the executable codes may be executed, i.e., the snippets become operable, when their geographical and calendar context match that of a user device searching the snippet index.

FIG. 1 shows an exemplary index comprising snippets. We refer to such a data structure herein as a snippet database. The data in the received snippets may be organized in a tabular structure whose rows identify snippets and columns identify various attributes of the snippets (as gleaned from the extraction process). The various illustrative attributes shown in FIG. 1 carry the meanings shown in FIG. 2.

Thus, for instance, the attribute "Cal" refers to the calendar context and the attribute "Loc" refers to the geographical context. The attribute "code" refers to the case when the snippet is associated with executable code. In such a case, the value in the column may be the executable code or a link from where the code may be obtained. The attribute "Rel" in FIG. 2 is especially noteworthy. This attribute specifies a list of category names that may be used to search and match snippets. Thus, if a search request is received for snippets matching "Music" and a snippet has a "Rel" tag "Chopin", service logic of the snippet database may infer a match and find ("discover") the indicated snippet.

A developer of a snippet associated with executable codes may specify a geographical location that serves as a context associated with the snippet. For example, the developer may specify that the snippet applies to the geographical location (by specifying GPS coordinates, by way of example) of Yankee Stadium in New York. The developer may also specify a date and time, i.e., a calendar context, when the snippet becomes applicable. For example, the snippet may only be applicable on game days and game times. The idea underlying snippets and their geographical and calendar contexts is that the snippet is only discoverable and operable when the specified context is satisfied.

That is, the user communications device requesting execution of a snippet needs to provide a calendar and a geographical context that satisfies the geographical and calendar contexts associated with the snippet in the snippet database. If the provided data does not satisfy the stored contexts, i.e., does not match, the snippet may not be discoverable and operable. In the latter case, the executable codes of the snippet are not executed and a general message may be communicated to the user communications device.

Therefore, when making a request in accordance with the methods described herein, the user communications device should have a geographic, calendar and device context (as discerned, for instance, by one or more sensor devices associated with the user device or associated with an environment where the user device is located) that satisfies the contexts associated with a snippet in the snippet database.

In an alternative embodiment, a user communications device may specify a user request with hypothetical geographic, device and calendar contexts, e.g., by using an appropriately designed query language. The snippet database may then be searched to discover snippets that satisfy the hypothetical contexts and their corresponding executable codes may be executed.

In some embodiments, the geographical, device and calendar contexts associated with a snippet may be specified by a consumer rather than the developer of the snippet. That is, the snippet database may allow a consumer to author the geographical, device and calendar contexts of one or more snippets. For example, a consumer may specify that a snippet may be made operable for a location and time specified by the user. In such cases, multiple copies of the snippet may be created and stored in the snippet database so as to accommodate multiple consumers.

In one embodiment that will be used for illustrative purposes below, the snippets are assumed to be associated with executable codes.

An interesting case occurs when snippets with executable codes specify a geographical context. Consider, by way of example, a retail store that may provide snippets (with executable codes) that have a geographical context pertaining to the location of the store. That is, we may now say that the executable code of the snippet is to be executed (i.e., the snippet becomes operable) upon request by a user communications device when the device is in the geographical environment of the retail store.

Thus, a consumer may be visiting a retail store. While within the geographical environment of the store, the consumer may discover one or more snippets with executable codes. When the codes are executed, the consumer may be informed, say, of the items in the store that he may prefer or items that are on sale, etc. That is, snippets with executable codes are computer programs that operate in specific geographical environments and may provide services to consumers in those environments.

A consumer at Yankee Stadium on game day may be searching for food items using the search function (search engine or search app) on his user communications device. Thus, his geographical context may be the location of "Yankee Stadium", his calendar context may be given by the time and data sensor of the user communications device, and his device context may be "searching for food items". One or more snippets may be discoverable by such a consumer and the associated executable codes when executed may provide services to the consumer. For example, the executable code of a snippet may direct the consumer to a food stall.

Environmental Datasets

In co-pending U.S. patent application Ser. No. 14/701,858, which is hereby incorporated by reference in its entirety, an environmental dataset was defined as data pertaining to a geographical area. Cell towers installed for supporting mobile communications are often used for locating mobile devices in geographical areas. Global Positioning Systems (GPS) further improved the accuracy of location identification. Smaller-sized cell tower technologies such as pico-cells, femto-cells, etc., have also been used for mobile communications and for location tracking in indoor spaces. Wi-Fi routers and access points have also been used for determining locations of devices. Recently, so-called "beacon devices" provide improved location tracking capabilities in indoor spaces.

More recent times have seen the introduction and installation of "smart" devices such as thermostats, refrigerators, clocks, etc., that broadcast signals that may be used for location tracking, making mobile devices (and hence their users) aware of the presence of the installed device/service. In some cases, the installed devices may also have connections (wired or wireless) to communications networks such as the Internet. In certain cases, the installed devices may broadcast music, video or other multimedia data that may be received by user devices in the environment.

An important feature of the above-mentioned devices is that they broadcast Radio-Frequency (R/F) signals that may be used by receiving devices for various purposes. In most cases, the range of the signals is limited, e.g., in Wi-Fi and beacon technologies the range is of the order of hundreds of yards. GPS provides a bigger coverage area; however, its accuracy suffers in indoor spaces.

In one aspect, the present invention is concerned with devices that broadcast data/signals using technologies such as satellite based systems, tower-based cell systems (macro cells and micro cells), and Bluetooth or Wi-Fi-based routers, etc. Examples of such broadcasting devices include cell towers, pico and femto cells, GPS, Wi-Fi routers, beacon devices such as Gimbal, devices using the iBeacon specification, etc. We will refer to all such devices as Broadcast Devices (BDs).

As a user communication device moves, it goes out of range of signals from certain BDs and comes into the range of signals from other BDs. Thus, at any given time, an area of geography may be determined wherein a receiving device (a communications device) is able to receive signals from one or more BDs. Such a coverage area may be referred to as an environment. That is, an environment is defined with respect to the receiving device and the particular BD from which it is receiving signals. The data pertaining to an environment is known as an environment dataset.

It should be noted that if a mobile device is simultaneously receiving signals from two different BDs, then the mobile device is simultaneously located in two different environments, each associated with one or more different BDs. It should also be noted that an environment might not have a regular shape, e.g., circular or oval, etc. Rather, the shape of an environment is determined by the signal reception capability of the user devices in that environment.

It is to be further noted that no assumption is being made as to where the one or more BDs are installed within an environment. In particular, the BDs may be installed anywhere as long as their broadcast signals may be received within a geographical area. For example, GPS satellites exist in Earth orbits but their signals are received at various geographical areas on the surface of the earth.

User communications devices may receive the signals broadcast by BDs in a geographical area that defines the environment. Generally, user communications devices support applications ("apps"), and said apps may operate using data received from the signals transmitted by one or more BDs. In some cases, the app must first register to receive signals from the one or more BDs. When the user device's operating system receives such signals, it makes registered applications aware of the receipt of said signals. In common usage, when applications are made aware of a received signal, they may relay the signal to one or more servers using a network connection to a wide area network, e.g., a cloud infrastructure, wherein the servers assemble the received data into one or more datasets.

As used herein the term Environment Data Set (EDS) is a collection of data pertaining to an environment, received either from devices in an environment or from external sources (e.g., sources external to the environment).

A planogram is a diagram or model for describing the layout of items in an environment, in current usage most often a retail store, though it is not limited to such. Thus, a planogram is a type of EDS in the sense that it is data about the premises of an enterprise such as a physical retail store and the layout of its contents. It is usually available from external sources. Signal data gathered from devices such as mobile devices in an environment are another example of an EDS; in this case the dataset comprises data received by devices from the BDs in the environment. In this example, the dataset may in fact be gathered in real-time. Thus, EDS may be gathered in real-time or they may be available from third-party sources.

In the systems and techniques described herein, we associate geographical environments with the geographical context of snippets. Consider, by way of example, the geographical environment of Yankee Stadium. We may now define one or more snippets whose geographical context is the location of "Yankee Stadium". That is, the snippets become relevant in the context of Yankee Stadium. A user communications device when at Yankee Stadium may thus cause one or more of the executable codes of the snippets to be discovered and its associated executable codes to be executed. That is, we may say that the snippets become operable in the context of Yankee Stadium.

A consumer at Yankee Stadium may thus obtain services from the execution of operable snippets.

A retail store or other enterprise may define an environment corresponding to its location. For example, the retail store may define a geo-fence surrounding its store location suing GPS signals. The retail store may define one or more snippets whose geographical context may correspond to the location of the store. Furthermore, the retail store may associate one or more EDS with its location. Thus, we may have a situation in which executable codes may be executed on EDS pertaining to a geographic location. For example, the EDS may be a planogram of the retail store and the executable code of a snippet, when executed, may guide the consumer to locations within the store where certain items are displayed.

The geographical area of a store or other enterprise may represent a geographical environment. A snippet whose geographic context is defined over the area of the store may thus be said to be operable in the environment. A smart car traversing a route along a series of stores or other enterprises may thus traverse a sequence of environments in which different snippets may be operable.

Mediation

The term mediation refers to changing one or more EDS with respect to user preferences. In application co-pending U.S. patent application Ser. No. 14/701,858, the contents of which are incorporated by reference in its entirety, the notion of mediation has been described and the derivation of one or more representations has been explained. We illustrate the notion of mediation briefly in the following.

For example, consider a user "John" in the environment of a retail store, i.e., the geographical area of the store is such that John's user device may receive broadcast signals from the environment.

The signal data from "John's environment" is one example of an EDS. A planogram describing the contents, i.e., inventory, and its layout is another EDS.

Given the two EDS as above, we may have a mediation of the EDS according to John's preferences, e.g., the EDS may be used to generate a representation of the EDS, with clothes being at the "top" of the representation because the system has inferred that John prefers clothes.

Using the same EDS, mediation for a different user "Alice", may yield a list in which edible items are prominent. In other words, mediation using the same EDS may infer different intents for different users, yielding different results.

Whereas the above example shows that mediation of one or more EDSs may cause some of the details of an environment to be deleted or removed from the resulting representation, in general, one or more details may be added, removed, highlighted, modified, etc. An incremental mediation process is also possible wherein the user interacts with the representation and (e.g., explicitly) adds, deletes, modifies the contents of a representation in an interactive manner.

A second form of mediation may be referred to as device mediation. Typically, device mediation refers to taking a representation derived by mediation from one or more EDSs as input and manipulating it to produce a (second) representation that fits the needs or aesthetics of one or more user communications devices. For example, the mediated representation of the retail environment for John may be further mediated for John's smartphone device. Extending the example, the mediated representation might be further mediated for John's smart glasses as a holographic image or a 3-D representation.

This second type of mediation is also sometimes referred to as rendering.

As used herein, the term user communications device is a consumer device that serves as a communications device for voice and/or multimedia data and that provides computational capabilities. It provides connectivity to various networks including but not limited to private data networks, IP networks, Internet, wide area networks, the Cloud, Public Land Mobile Network, short range wireless networks such as Wi-Fi and Bluetooth, etc. Examples of such devices include, without limitation, smart phones, tablets, PDAs, smart glasses, smart watches, 3-D holographic glasses, virtual reality headgear, game controllers, etc.

It should be noted that certain user communications devices such as smart glasses and smart watches operate by associating themselves to the user's smartphone device using short-range radio protocols such as Bluetooth or Wi-Fi, etc. In such situations, the present invention envisions that associated devices work as a single virtual user device. References herein to a "user communications device" thus refer to a single device or a virtual device that consists of associated devices. Thus, for example, a smart watch associated with a smartphone may receive broadcast signals in an environment and may make the smartphone or the applications on the smartphone aware of the received signals, or vice versa. Similarly, representations may be rendered on the smartphone or the smart glasses, etc. It might be that a representation is produced that is further mediated to be rendered on two devices that differ in aesthetics or capabilities. For example, one device may support 2-D representations whereas the second device may support 3-D or holographic representations.

Conventionally, geographic environments have been associated with apps as follows.

A user communications device may receive data/signals from an environment by obtaining one or more apps that then "register" for specific signals, i.e., signals from certain kinds of BDs. For example, a retail store may define a geo-fence using GPS signals. It may also define an environment using beacon devices. (Beacon devices are small R/F transmitting devices that operate over a range of a dozen meters.) The retail store may provide an app that, when downloaded, may register with the operating system of the user device for signals from the beacon devices. Typically, each beacon device broadcasts signals that contain an identifying serial number that may be used to distinguish between different beacon devices. When the operating system of the user device receives such signals, it informs the registered app, which may then process the received signals. Thus, in order to receive and process signals, a user device must first obtain one or more apps that register for such signals. A user device that does not have such apps, may not receive any signals from the environment.

Thus, apps on user devices are a pre-requisite to receiving signals from an environment. A consumer in an environment may receive services from apps on his user device that are receptive to signals being broadcast in the environment.

However, this scheme suffers from the requirement that a user device must be provisioned with a suitable app before it can receive signals from an environment. If the consumer visits multiple environments (e.g., the consumer may visit a number of retail stores in a mall), his user device must be provisioned with suitable apps for each of the visited stores.

In descriptions that follow, we show methods by which consumers may receive services from operable snippets without needing to download apps.

Particularly, the idea of associating a snippet's geographic context with that of a geographical environment, may allow a snippet's executable codes to be executed (e.g., in a cloud-server arrangement) when a user device is in that geographic context. We describe below how such executing code may deliver services to user devices without using apps.

User Preferences

As has been mentioned above, user preferences are needed during the mediation phase.

Conventionally, user preferences, likes, etc., are derived from historical user data. For example, a website possessing the purchase history of a consumer may process that history to derive the user's likes and preferences. A user's search history and cookie information may also be used to derive user likes and preferences. In some cases, user preference data may also be obtained from third-party providers.

Typically, the consumer has no control over the processing or obtaining of his purchase history or his cookie information. The service provider processes the information according to its own internal mechanisms.

In U.S. patent application Ser. No. 15/475,748, the contents of which are hereby incorporated by reference in its entirety, systems and methods are described that allow computer programs or other entities to share user data and preferences. The sharing method provides and maintains several properties that may be desirable to both users and businesses. A salient feature of the sharing technology is that the user device is always in control of, and integral to, the sharing protocol.

Consider, by way of example, a user communications device in a retail environment that is receiving signals from the environment, i.e., the user device may have a suitable app. The app may transmit the received signals to a server where they may be processed and one or more snippets may be executed. The execution of the snippets may provide services to the consumer via an app on the user device.

In order to provide personalized services, the executable codes of the snippets may need user preferences. As mentioned before, conventionally, user preferences may be obtained from third-party providers or from the consumer's past purchase history. However, user preferences may compromise privacy of users.

As smart devices (e.g., smart appliances) are increasingly being embedded in various environments (e.g., homes, businesses) and as the ability to control and regulate various environmental parameters increases, user preferences will play in increasingly important role and the privacy concerns of the users need to address.

In one aspect, the subject matter described in U.S. patent application Ser. No. 15/475,748 involves service providers who possess user data to process such data and derive user preferences from it. However, they are constrained as per the methods of U.S. patent application Ser. No. 15/475,748 in the manner in which the derived user preferences may be shared with other computing entities.

In particular, consider a first service provider SP1 who has derived user preferences for a user from the user's purchase history. A second service provider, SP2, wishes to acquire the derived user preferences. SP1 may provide user preferences to SP2 if the user in question authorizes the sharing. That is, a user may allow his data, e.g., preferences, at a first service provider to be provided to a second service provider.

The algorithms used by a service provider to process user data and derive user preferences may be publically known. Thus, a service provider receiving user data/preferences from another service provider may be assured that proper algorithms have been used for the derivations. In actuality, the receiving service provider may test the received user data and preferences to ensure that the indicated algorithms were used in the derivation process. Thus, a service provider, upon receiving user data, may be assured of its validity and provenance.

Such guarantees of validity and provenance may be provided to a receiving service provider by using algorithms that create cryptographic credentials that encapsulate user preferences. For example, an algorithm may create a credential encapsulating the user preference "user likes classical music". We may view such a credential as comprising cryptographic data and an accompanying statement (e.g., a meta statement), viz., "user likes classical music".

The validity of the cryptographic data in a credential may be verified using techniques described in U.S. patent application Ser. No. 15/475,748, which may also verify that it was generated by a known algorithm. A service provider may thus verify received information as to validity and provenance. It may then use the user preference for its own purposes.

It is to be noted that the service provider who receives a user preference encapsulated as a cryptographic credential does not know anything about the user, other than the encapsulated preference. Thus, for example, a service provider may know that a user likes classical music. He may not however know the user's name, address or any other personal information. In this manner, the sharing of user preferences preserves the privacy of the user.

That is, cryptographic objects encapsulating user preferences may be viewed as credentials referring to the user's preferences. Application Ser. No. 15/475,748 describes how such credentials (also called cards or preference cards) may be obtained from one or more service providers by a user communications device and presented to one or more computer programs. Alternatively, the credentials may be provided by an external service provider directly to one or more computer programs under authorizations provided by the user communications device.

FIG. 3 shows an arrangement in which a user communications device 100 is within an environment 400 with broadcasting devices BD1 and BD2. The user device 100 may be provisioned with one or more preference cards by preference card issuer 300 via interface 211. Alternatively, the preference card issuer 300 may provide the preference cards directly to a database complex 200 via interface 311 under authorization of the user device 100. The database complex 200 receives one or more EDS related to the environment 400. The database complex 200 also contains a snippet database from which operable snippets may be discovered by requests emanating from the user communications device 100. (The entities VM 204, Website 205 and Database Processor 206 are discussed below.)

Generating Representation(s) of an Environment for a Single User

FIG. 4 shows one example of a general method by which a user communications device may request and obtain a representation of an environment utilizing user communications devices that contain one or more suitably configured apps.

In step 100(*a*), one or more developers "push" one or more snippets to a database complex. As mentioned above, snippets may also be extracted ("pulled") from webpages and web catalogs by a process of, e.g., web crawling. The received snippets may be accompanied by one or more attributes describing the snippets. Generally, attributes describing the geographical, calendar and device contexts will accompany the received snippet. In embodiments, in an initialization step, one or more user devices may be permitted to specify the contextual attributes. Exemplary attributes have been shown in FIG. 2.

As mentioned earlier, in this example the snippets are assumed to have executable codes associated with them.

In step 100(*b*), the database complex constructs the snippet database. An exemplary snippet database has been shown in FIG. 1.

In step 100(c), the database complex associates EDS with the stored snippets. This association may be specified via attributes by the developers of the snippets. For example, a developer may provide the address by specifying a link (cf. Link attribute, FIG. 2) to where the EDS are stored. If the EDS are collected in real-time, a developer may specify the address of a computer program that, e.g., provides a stream of data using a pre-provisioned application programming interface (API).

In step 100(d), the user device downloads one or more apps and initializes them for later use. For example, a consumer may download an app provided by his favorite retail store so that he may receive personalized services when he visits the store. As mentioned above, devices without appropriate apps may not be able to receive data/signals from environments. As a part of the initialization phase, service logic of the app may register with the operating system of the user device to receive data/signals from one or more environments.

In step 200(a), the user device launches a previously downloaded and initialized app and uses features of the app to request a representation of the environment in which the user device is currently located. Recall that discovery of snippets and the corresponding execution of their executable codes is controlled by a matching process that matches the geographic, device and calendar context of a user device with the same contexts associated with a snippet. If the contexts do not match, the executable codes of the snippet are not executed, i.e., the snippet is not operable. The app launching may, in embodiments, be triggered by the reception of one or more data signals from one or more environments.

In step 200(b), the app transmits its geographical, calendar and device context to the database complex. Note that this contextual data may be obtained by the app from one or more sensor devices associated with the user communications device, e.g., the location sensor of the user device. Alternatively, it may be obtained from broadcasting devices installed in the environment where the user device is located.

In step 300(a), the database complex, having received contextual data from the user device, may now discover relevant snippets in the snippet database. Note that relevancy of snippets depends on the received contextual data matching the stored contextual data (the various attributes) of the snippets.

In step 300(b), the database complex discovers one or more EDSs associated with the snippets. Note that, in some embodiments, the data comprising the EDSs may be collected from real-time sources, e.g., it may be broadcast from BDs installed in an environment. EDS data also may be available statically, e.g., from a Planogram dataset.

In step 300(c), the database complex requests and receives user preferences. As described above, the user preferences may be provided by the user communications device.

In step 300(d), the database complex changes or modifies the EDS with respect to the received user preferences and, in step 300(e), constructs executable code that is used to generate the one or more representations of the EDS accordingly.

Conventionally, several methods are known by which data in an EDS may be changed, supplemented, removed, filtered, merged with other EDSs, etc., with respect to user preferences. Several types of executable codes are known in the literature, e.g., HTML scripts or Javascript. In step 300(f), the constructed executable codes are sent to the user device.

In particular, the database complex may include, additionally, the executable code associated with the snippet, in the constructed executable code. Thus, when executed, the snippet code may provide services that are specific to the environment for which the snippet has been customized.

In step 400(a), (an app on) the user device receives the executable codes. It may impose a second mediation process to render them suitable for display. Note that the representations may contain interactive components that support user interaction. For example, representations may contain clickable objects or have action buttons that launch user dialog boxes, etc. In step 300(d), the executable codes are rendered on the user device by the app.

In step 500(a), the user may now interact with the executable codes using the one or more interactive components contained therein.

We now observe that the above method suffers from the following drawbacks.

1. A user communications device that does not have an appropriate app may not be receptive to signals/data from environments and may not be able to utilize the capabilities described herein. That is, having the proper app is a pre-requisite.
2. The user communications device is asked to provide user preferences and this may be construed as an invasion of privacy. For example, a service provider may discover, e.g., that a user likes classical music and proceed to target the user with advertisements.

FIG. 5 shows an alternative method that modifies the method shown in FIG. 4 to circumvent the above problems.

FIG. 5 shows two major differences from that of FIG. 4.

First, the user communications device is not required to download appropriate apps in an initialization step. Rather, the user device may, in one embodiment, utilize a web browser to make a page request from a website. For example, a consumer in a retail store, say DSW, may point his browser at the store's website, say www(dot)DSW(dot)com and the latter may display a link which when clicked re-directs the user to the database processor (cf. 206, FIG. 3). The process of re-directing requests to a different address is well-known in IP networking. The database processor is a supervisory program that has access to both the EDS datasets and the snippet database. The database processor launches a virtual machine (VM) in a computing environment. The VM has access to the snippet database and the EDS datasets.

As used herein, the term "virtual machine" or "virtual machine environment" is to be given its conventional meaning as used by those of ordinary skill in the art. Generally, a virtual machine is an emulation of a physical computer system using hardware, firmware, software or a combination thereof. For instance, "operating system level virtualization" is one known technique for implementing virtual machines. In this technique, a physical computer is virtualized at the operating system level, enabling multiple "isolated" and "secure" "guest" (software) machines, i.e., virtual machines, to run on a single physical computer. The term "secure" implies that only pre-determined operations can be executed in the guest machine. The term "isolated" means that the operations may not access resources in other guest machines. All guest machines share the same kernel, but may have individual user spaces. Thus, computer/application programs running in a guest/virtual machine view it as a standalone computer system. Examples of software systems using operating system level virtualization techniques include Solaris Containers, iCore Virtual Accounts, Linux-VServer, etc.

We note that another known technique for supporting virtual machines uses a hypervisor or virtual machine monitor that allows guest machines to run their own kernels. For example, hypervisor may support three guest/virtual machines running macOS, Windows, Linux, respectively, on a single physical computer. Major Unix vendors sell virtualized hardware, e.g., Sun Microsystems, HP, etc.

In the descriptions that follow, a computing environment is a programmable arrangement of hardware, software and/or firmware. The term "database processor" may denote, in one embodiment, an operating system (OS) of a computing environment, the OS being suitably configured to support features such as virtual machines, session management, etc.

The term "session" as used herein refers to a process of information exchange between two or more communicating devices or computer programs in which information used in the exchange may be stored in a specific memory or set of registers that are then cleared ("torn down" or "terminated") later. Devices and/or computer programs may also be invited and removed from a session or may initiate or terminate one or more dialogs during a session where a dialog is a sequence of data items exchanged between devices and/or computer programs.

Thus, while the term "database processor" is known in prior art, its use in the present invention requires several new innovations and features, e.g., the creation and management of virtual machines, etc.

We can now explain the second major difference in FIG. 5 from that of FIG. 4. The difference lies in the manner in which the user preferences and a snippet's executable codes are processed in the VM. As explained above, the user preferences may be obtained as cryptographic objects. Thus, the VM receives user preferences as verified credentials that it may trust. Concomitantly, the VM may not store or send the received preferences to a third-party since the VM may be configured to disallow such operations.

At the conclusion of the session with the user device, the VM may be cleared and all data and records of the VM may be cleared.

We now describe the method of FIG. 5 in more detail.

In steps 100(a-c), snippets are obtained from web resources such as web sites and the like and a snippet database is constructed. The snippets are associated with EDS datasets, if available. As mentioned above, the association between EDS and snippets may be specified by developers who may use the "Link" attribute (FIG. 2) to specify addresses from where the EDS pertaining to a snippet may be obtained. Alternatively, a consumer may be allowed to specify an environment, e.g., his smart home, where one or more broadcasting devices may have been installed, e.g., smart thermostats. The data generated from such installed devices may generally be available from one or more service providers. A consumer may then specify the address of such service providers using the Link attribute (as above) or the database complex may use programmatic means to infer such address and associate the EDS with snippets. Thus, e.g., snippets may be associated by a consumer with the environment representing his home.

In step 200(a-b), a consumer utilizes the browser on his user device to visit the website of a service provider, e.g., a retailer. The visited website may contain a link that when clicked re-directs the user device to the database processor (cf. 206, FIG. 3). The consumer may be motivated to visit the website, for example, upon viewing an advertisement in an environment that is currently visiting. Alternatively, the consumer may be aware of the website a priori as a result of out-of-band processes.

In step 250, the database processor creates a computing environment with a virtual machine, VM (cf. 204, FIG. 3), that has access to both the EDS datasets and the snippet database.

In steps 300(a-j), we proceed as follows.

The VM requests the user device for its geographic, device and calendar contexts and user preferences. The latter may also be provided under authorizations of the user device from a third-party provider using the previously discussed preference cards or credentials. The VM matches the device geographical, calendar and device contexts (received from the user communications device) with the attributes of the snippets in the snippet database. In this manner, the VM discovers the relevant snippets that, in turn, identify corresponding EDS datasets. The VM then modifies the EDS datasets based on the received user preferences and constructs one or more executable codes. In particular, the database processor may include, additionally, the executable code associated with the snippet, in the constructed executable code. Thus, when executed, the snippet code may provide services that are specific to the environment for which the snippet may have been customized.

The VM sends the constructed executed code(s) to the website initially visited by the user communications device and re-directs the user communications device to the website.

In step 400, the website incorporates the received executable codes into one or more web pages.

In step 450(a-c), the user device receives one or more web pages from the website as a response to its initial request and renders the received web page(s).

In step 500(a), the user may now interact with the interactive components in the rendered web pages. In step 500(b), the user may end his session at which point the database processor, upon being informed, e.g., by the website, clears the VM, thus clearing it of any user data.

Generating Representation(s) of an Environment for Multiple Users

The method described in FIG. 5 may be unsuitable when representations need to be rendered for a collection of users who are in a common environment. We propose a process of managing multiple user preferences to solve the issue as follows.

The VM (FIG. 5) may receive user preferences from one or more user devices in an environment, e.g., occupants of a vehicle or a smart home, or customers in a retail store. The received preferences may now be rank ordered. For example, if the user preferences relate to music, the music pieces may be rank ordered by user preference. We obtain a table that lists the most popular song, followed by the second most popular song, etc. That is, the table is organized as frequency of users who like a song by the rank of the song.

We may now apply a statistical distribution technique such as, for example, the discrete Pareto distribution to the obtained table. In a Pareto distribution, approximately 80% of the sample are obtained from 20% of the sources. Thus, heuristically, 80% of the occupants are likely to prefer the top 20% of the ranked songs.

Prior art teaches many statistical distributions such as the Pareto distribution; even Pareto has many variants. We propose that one or more such distributions may be used as heuristics to aggregate user preferences for creating representations intended for collections of users in an environment.

In a related embodiment, we note that personalization of Internet content on a per user basis may lead to generally deleterious consequences, e.g., "filter bubbles", in which users receive self-enforcing content and views. We propose the use of the above method of aggregation of user preferences as potentially one partial solution to this problem. For example, all content of a certain type, say political news of the day, could be organized according to user preferences and a percentage chosen for delivery to a group of users as their personalized content. That is, we propose to replace individually personalized content with personalization for a group of users.

Alternatively, we could add items obtained by the group personalization method to the individual personalization derived for a user. In this manner, users would be served, e.g., news of the day, that is statistically likely to be their preference and, hence, may contain news that is not congruent to their preferences, i.e., some of the news served to them may lie outside their "filter bubbles".

Generating Representation(s) for a Sequence of Environments

We note, as discussed in the illustrative embodiment above, that in some situations, a collection of representations may be needed, e.g., a smart car may be traversing a known route and thus may enter and exit different environments. Thus, the en route environments may be determined by using navigation software and representations may be pre-computed and made available to the VM a priori. Thus, the VM may pre-calculate executable codes using (aggregated) user preferences, if needed, and provide the representations to the web site in synchronization with the traversal of the route by the smart car.

Alternative Embodiment

Those of ordinary skill in the art would have noticed that in the above descriptions, we use a computer program, i.e. the VM, to create executable codes that may contain executable code from one or more snippets. Thus, technically, these two types of executable codes may in practice be merged into a single executable code. One well-known technique for doing this would be the use of subroutines by which one computer program may be included in another.

This implies, inter alia, that the concept of snippets may be dispensed with entirely (since in the examples above, we limited ourselves to snippets with executable codes). In such alternative embodiments, executable code may be developed and associated with one or more geographical environments using any number of methods.

For example, a database system may be developed that maintains a table of executable codes associated with various geographical environments and their corresponding EDS. That is, the columns of such a table may comprise "Executable Codes", "Geographic Environment" (specified as e.g., GPS coordinates), and "EDS" (locations from which corresponding EDS may be obtained).

Concomitantly, since the notion of snippets may be dispensed with in this alternative embodiment, the concept of associating snippets with EDS may also be dispensed with. Furthermore, an environment may not need to install broadcasting devices since, in our invention, the user foregoes the use of apps; rather, the user launches the browser on his user device to visit the website of the environment he is currently visiting. Because the user does not need to use one or more apps, the signals from the one or more BDs in an environment are of no use to the user device.

In summary, in an alternative embodiment, a user visits a geographical environment and uses the browser on his user device to visit the environment's website. The website may, in one embodiment, re-direct the user device to the database processor. The database processor may then create a VM in a computing environment. The VM may ask and receive various contextual information from the user device to discover relevant executable codes in the tabular data structure discussed above. For example, the user device may provide its GPS location information and the VM may search and match the provided GPS location with the GPS location data specified in the table. Thus, the VM may discover the EDS and the executable codes for the current environment of the user device. Note that the VM may be provided access to the tabular data structure to carry out the actions described herein.

The VM may then create executable codes and send them to the website which may convert them into one or more web pages for use on the browser of the user device.

Since installing beacons and other broadcasting devices are costly and require continued maintenance, such an embodiment would offer a significant commercial advantage.

It is to be noted that most user communications devices provide web browser software as an integral feature. Furthermore, the user may configure the operating system of a user device to allow the browser to access his location data and data from miscellaneous other associated sensor devices.

Illustrative Computing Environment

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a sequence of steps, flow diagram or block diagram. Although each may describe the operations as a sequential process, many of the operations can be performed in parallel or concurrently. In addition, the order of the operations may be rearranged. A process may have additional steps not included in the figure.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

Figure 6:
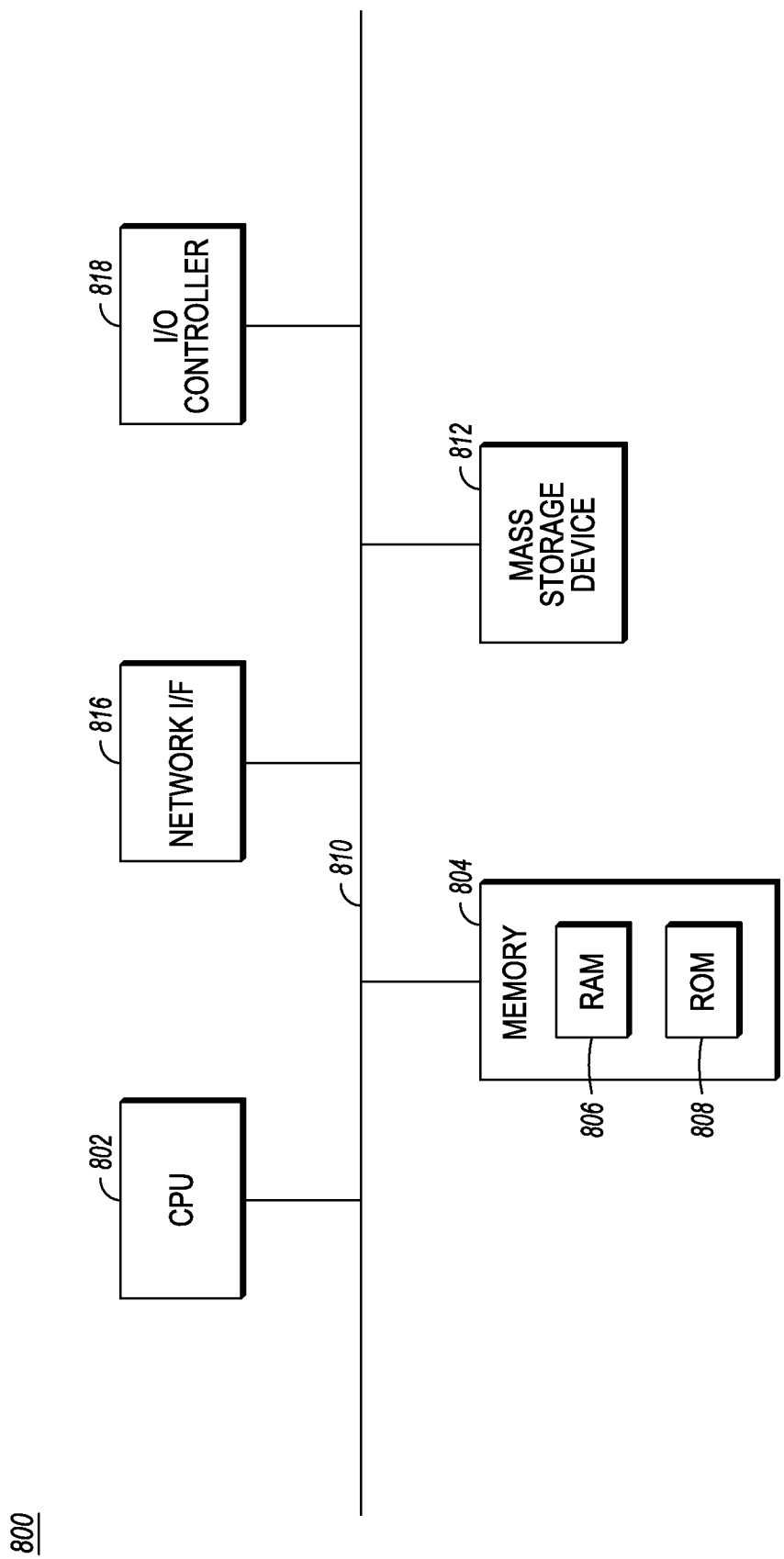
FIG. 6 shows an example architecture for a device such as the user communication devices or database complex shown in FIG. 3

FIG. 6 shows an example architecture 800 for a device such as the user communication devices or database complex shown in FIG. 3 which are capable of executing the various components described herein for implementing aspects of the techniques described herein. Thus, the architecture 800 illustrated in FIG. 12 shows an architecture that may be adapted for a server computer, mobile phone, a PDA, a smartphone, a desktop computer, a netbook computer, a tablet computer, GPS device, gaming console, and/or a laptop computer. The architecture 800 may be utilized to execute any aspect of the components presented herein.

The architecture 800 illustrated in FIG. 6 includes a CPU (Central Processing Unit) 802, a system memory 804, including a RAM 806 and a ROM 808, and a system bus 810 that couples the memory 804 to the CPU 802. A basic input/output system containing the basic routines that help to transfer information between elements within the architecture 800, such as during startup, is stored in the ROM 808. The architecture 800 further includes a mass storage device 812 for storing software code or other computer-executed code that is utilized to implement applications, the file system, and the operating system.

The mass storage device 812 is connected to the CPU 802 through a mass storage controller (not shown) connected to the bus 810. The mass storage device 812 and its associated computer-readable storage media provide non-volatile storage for the architecture 800.

Although the description of computer-readable storage media contained herein refers to a mass storage device, such as a hard disk or CD-ROM drive, it should be appreciated by those skilled in the art that computer-readable storage media can be any available storage media that can be accessed by the architecture 800.

Although the subject matter has been described in language specific to structural features and/or methodological acts, it is to be understood that the subject matter defined in the appended claims is not necessarily limited to the specific features or acts described above. Rather, the specific features and acts described are disclosed as example forms of implementing the claims.

The invention claimed is:

1. A method of obtaining a representation of an environment, comprising:
    requesting device context information from a user communications device associated with a user, the request being sent to the user communications device from a virtual machine environment established by a database processor, the virtual machine environment being established by the database processor in response to a request received from the user communications device over a communications network for the representation of the environment associated with a third party;
    requesting user preference information;
    receiving in the virtual machine environment the device context information and the user preference information;
    based at least in part on the device context information, identifying at least one environmental data set ("EDS") that is associated with the environment and includes information reflective of the environment;
    receiving the at least one EDS in the virtual machine environment;
    while in the virtual machine environment, modifying the at least one EDS based at least in part on the user preference information;
    constructing executable computer code for generating a representation from the modified EDS; and
    causing the executable computer code to be sent to the user communications device.

2. The method of claim 1, wherein the request from the user communications device is received by a website from a web browser of the user communications device, the user communications device being re-directed from the website to the database processor.

3. The method of claim 1, wherein modifying the at least one EDS includes supplementing the EDS with additional information based on the user preference information.

4. The method of claim 1, wherein modifying the at least one EDS includes filtering the EDS to remove selected information therein based on the user preference information.

5. The method of claim 1, wherein modifying the at least one EDS includes supplementing the EDS with additional information based on the user preference information and filtering the EDS to remove selected information therein.

6. The method of claim 1, wherein the at least one EDS includes a plurality of EDSs and further comprising merging the plurality of EDSs.

7. The method of claim 1, wherein identifying the at least one EDS includes discovering executable code stored in a searchable database by matching the device context information with attributes of the executable code, the at least one EDS being identified by one of the attributes of the executable code that are discovered, the executable code being extracted from web resources and stored in the searchable database.

8. The method of claim 7, wherein constructing the executable computer code includes obtaining at least a portion of the executable computer code from the discovered executable code.

9. The method of claim 1, wherein requesting and receiving the user preference information includes requesting and receiving the user preference information from the user communications device.

10. The method of claim 1, wherein receiving the user preference information includes receiving a verifiable cryptographic credential that encapsulates the user preference information without exposing an identity of the user.

11. The method of claim 10, wherein the cryptographic credential is received in a virtual machine ("VM") from an entity other than the user communications device.

12. The method of claim 1, wherein the device context information includes geographic and calendar information associated with the user communications device.

\* \* \* \* \*